(12) United States Patent  
Wilensky (10) Patent No.: US 7,664,322 B1
(45) Date of Patent: Feb. 16, 2010

(54) FEATURE-BASED COLOR ADJUSTMENT

(75) Inventor: Gregg D. Wilensky, Pacific Palisades, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1221 days.

(21) Appl. No.: 10/639,612

(22) Filed: Aug. 11, 2003

(51) Int. Cl.
G06K 9/00 (2006.01)
(52) U.S. Cl. .............. 382/181; 348/224.1; 345/589
(58) Field of Classification Search ......... 382/162–167, 382/117, 100, 103, 108, 181, 190, 192, 195; 345/431, 418, 428, 581, 600, 589; 348/207.99, 348/221.1, 222.1, 223.1, 224.1, 78, 571, 348/575, 576, 577, 587, 599, 606, 612
See application file for complete search history.

(56) References Cited

U.S. PATENT DOCUMENTS

| | | | |
|---|---|---|---|
| 6,204,858 B1 * | 3/2001 | Gupta | 345/600 |
| 6,721,446 B1 * | 4/2004 | Wilensky et al. | 382/162 |
| 6,912,298 B1 | 6/2005 | Wilensky | |
| 7,042,505 B1 * | 5/2006 | DeLuca | 348/241 |
| 7,116,820 B2 * | 10/2006 | Luo et al. | 382/167 |
| 7,127,108 B2 * | 10/2006 | Kinjo et al. | 382/203 |
| 2002/0106112 A1 * | 8/2002 | Chen et al. | 382/117 |
| 2002/0126893 A1 * | 9/2002 | Held et al. | 382/167 |
| 2002/0136452 A1 * | 9/2002 | Schroder | 382/165 |
| 2002/0181746 A1 * | 12/2002 | Schwartz et al. | 382/117 |
| 2003/0007687 A1 * | 1/2003 | Nesterov et al. | 382/167 |
| 2003/0068084 A1 * | 4/2003 | Kinjo et al. | 382/164 |
| 2003/0190080 A1 | 10/2003 | Simard et al. | |
| 2004/0037460 A1 * | 2/2004 | Luo et al. | 382/165 |

OTHER PUBLICATIONS

"Photoshop Elements—Redeye Brush", http://www.debmchugh.com/pse/tool_redeye.htm, printed Aug. 11, 2003, 2 pages.
"Remove Red Eye in PhotoDeluxe", http://graphicssoft.about.com/cs/photodeluxe/ht/apdredeye.htm, About, Inc., 2003, 3 pages.
"Using the Red Eye Brush Tool in Photoshop Elements—Support Knowledge", http://www.adobe.com/support/techdocs/2F10a.htm, Adobe Systems Incorporated, 2002, 3 pages.
Jia Li and James Z. Wang, "Automatic Linguistic Indexing of Pictures by a Statistical Modeling Approach," pp. 1-24, (obtained prior to Aug. 11, 2003).
Jiuliu Lu and Lawrence Carin, "Hidden Markov Multiresolution Textures Segmentation," 31 pages, (Feb. 2002).

* cited by examiner

*Primary Examiner*—Anand Bhatnagar
(74) *Attorney, Agent, or Firm*—Fish & Richardson P.C.

(57) ABSTRACT

Methods and apparatus implementing a technique for adjusting the color of pixels in an image. The technique includes identifying a target region of pixels in the image that represent an object, the object having a shape and a predefined set of features; and adjusting the color of one or more pixels in the target region by an amount determined based on one or more probability functions and one or more spatial profile functions, each probability function defining a probability value at each of the one or more pixels in the target region, the probability value representing the probability that the pixel corresponds to one or more features of the object, each spatial profile function being defined based on one or more spatial properties of the object or one or more of its features.

42 Claims, 4 Drawing Sheets

FEATURE-BASED COLOR ADJUSTMENT

BACKGROUND

The present invention relates to adjusting colors in digital images. Conventional image processing programs provide a number of tools that allow users to adjust colors in digital images. Such color adjustment tools typically operate by changing pixel values (which can represent color, transparency or other information associated with the image pixels) throughout the image, or in a selected region of the image. In conventional operations, colors may be adjusted by changing, for example, the color balance of the image, or the chrominance and/or luminance (or the hue, saturation, transparency, and/or brightness) of colors of selected pixels, or by changing the color values themselves according to a predetermined color adjustment algorithm defined for the particular operation. Particular adjustment operations can include, for example, retouching operations such as smudging, blurring, toning, or sponging, as well as the correction of defects resulting from scratches or dust in selected regions of the image. The amount of the adjustment can be determined based only on information associated with the single pixel to be modified, such as when making a general change in hue, saturation, transparency, luminance, color balance, contrast, for example. Alternatively, the change may be determined by analyzing multiple pixels, such as when applying a Gaussian blur, which determines the amount of change by forming a weighted average value of pixels in the vicinity of the pixel to be changed.

Some conventional image processing programs provide tools implementing predefined adjustment algorithms designed to address specific situations or defects commonly found in digital images. One such defect is the redeye effect that can result when the retina of the human eye is exposed to bright light, such as the flash of a camera. This causes portions of the eye, typically portions of the pupil and/or iris, to reflect red light, and therefore appear red in the resulting photographic image. Redeye correction tools typically operate by inspecting individual pixels and/or by applying one or more predefined two-dimensional templates representing various appearances of the human eye to identify a potential redeye site within a user-specified region of the image, and applying a predetermined correction to the identified redeye pixels.

SUMMARY

In general, in one aspect, the invention provides methods and apparatus, including computer program products, for adjusting the color of pixels in an image. The techniques include identifying a target region of pixels in the image that represent an object, the object having a shape and a predefined set of features; and adjusting the color of one or more pixels in the target region by an amount determined based on one or more probability functions and one or more spatial profile functions, each probability function defining a probability value at each of the one or more pixels in the target region, the probability value representing the probability that the pixel corresponds to one or more features of the object, each spatial profile function being defined based on one or more spatial properties of the object or one or more of its features.

Particular implementations can include one or more of the following features. The spatial properties can include size or shape. The spatial profile function can be a sigmoid function or a Gaussian function. The amount of adjustment can increase as the probability value increases. The amount of adjustment can increase as the probability value decreases. The image can be photographic image including an eye exhibiting a redeye effect; and the identified region of pixels can correspond to a portion of the eye that exhibits the redeye effect. The feature can be one of skin, sclera, or redeye. Adjusting the color can include adjusting the color to match a representative color for the region, and using the probability values to modulate the amount of adjustment. The representative color can represent an iris color for the eye.

In general, in another aspect, the invention provides methods and apparatus, including computer program products, for redeye correction. The techniques include identifying a target region of pixels in an image, the target region corresponding to an eye exhibiting a redeye effect; determining an iris color for the eye; and correcting redeye in the target region by, for every pixel in the target region, blending the color of the pixel with the iris color by an amount that is based on a redeye probability, the redeye probability representing the probability that the pixel corresponds to redeye.

Particular implementations can include one or more of the following features. Correcting redeye can include avoiding the correction of pixels that correspond to skin or sclera. Correcting redeye can include applying extra correction to pixels that correspond to the ciliary margin of the eye. The method can further comprise eliminating redeye noise that is leftover from the correction.

The invention can be implemented to realize one or more of the following advantages. The use of probability values provides greater control over and allows greater correction of the desired regions while reducing unwanted modifications of the regions that should remain untouched. The use of probability values and spatial profiles increases the accuracy of the color adjustment and provides a smoother, visually more pleasing, result in a larger range of images. The use of probability values and spatial profiles also eliminates the need to identify particular segments of the image. This reduces the amount of computation required for the adjustment and enables adjustment to occur even for images that cannot be segmented.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
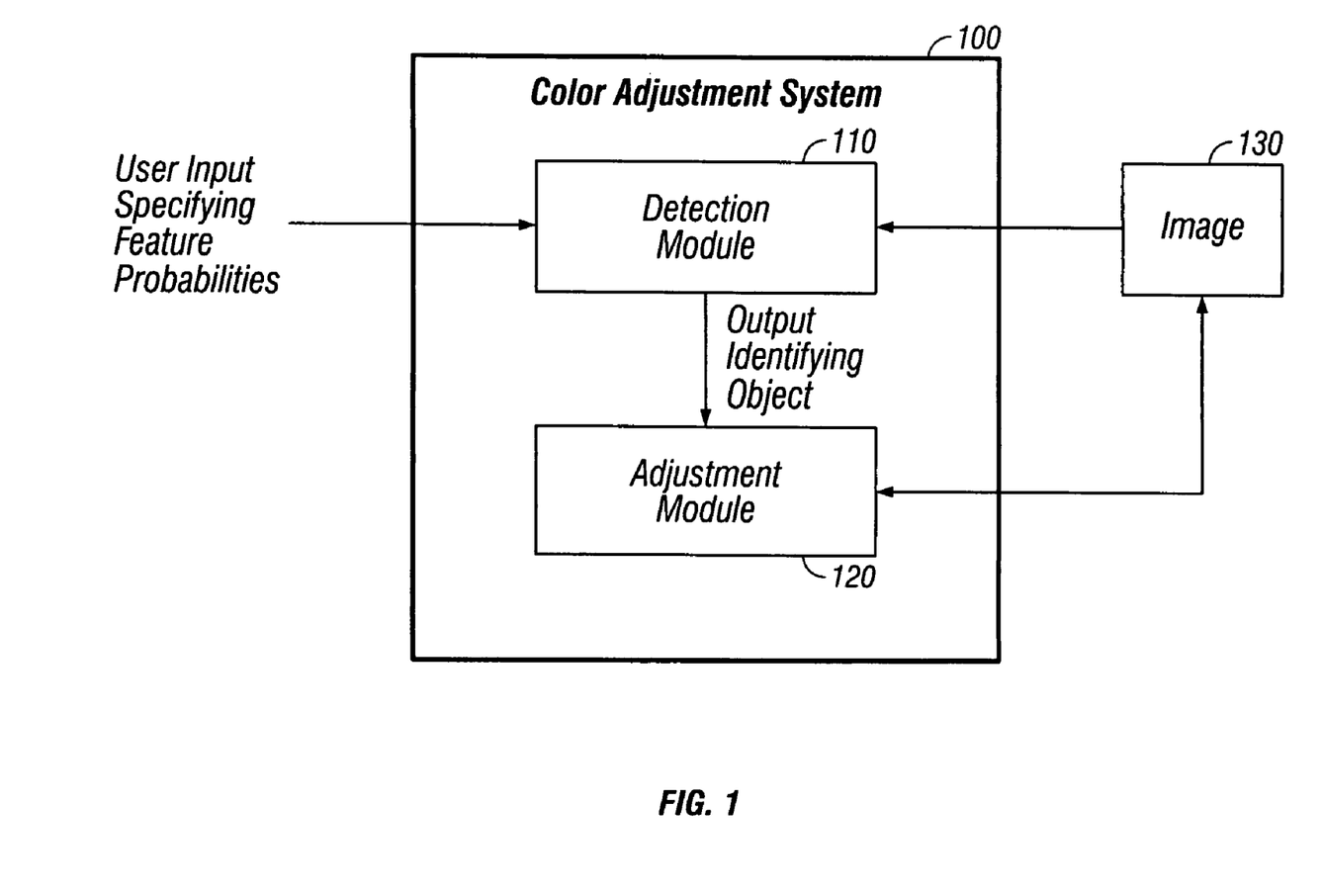
FIG. 1 is a block diagram of a system for color adjustment in accordance with the invention.

FIG. 1 is a block diagram illustrating a functional representation of a color adjustment system 100. The system 100 includes a detection module 110 and an adjustment module 120.

The detection module 110 is operable to receive an image 130. The image 130 can be a raster of rows and columns of pixels. Each pixel has one or more intrinsic properties (e.g., color, opacity) and each intrinsic property can have one or more associated values. Thus, for example, color can be represented as a set of values in any of a variety of color systems, such as the RGB (red-green-blue) color system, the CMYK (cyan-magenta-yellow-key) color system or the HSV (hue-saturation-value) color system.

The detection module 110 is further operable to scan the image 130 in any orientation (e.g., horizontally or vertically) or direction (e.g., left or right, up or down). The detection module 110 can scan the image pixel-by-pixel, or according to some other pattern (e.g., every other pixel, every other row).

The detection module 110 is further operable to detect an object of interest in the scanned image 130. As used in this specification, an object of interest is an object that can be described by a parameterized set of features that can include primary features that are more indicative of the object and secondary features that are less indicative of the object. The object can also be described in terms of relationships between the features. The relationships can include spatial relationships, for example, proximity between two or more of the features.

The detection module 110 detects the location of the object by identifying pixels in the image that correspond to one or more of the features of the object. A pixel that corresponds to a feature has certain characteristic property values (or ranges of values). For example, where the object is an eye that exhibits a redeye effect, the characteristic red pupil region is a primary feature of the eye and a pixel that corresponds to redeye has the characteristic color value of red.

The output of the detection module 110 can include data that identifies one or more pixels in the image as corresponding to the object. For example, the data can specify the coordinates of the pixel that corresponds to the center of the object. The data can also specify the size of the object. In the case of circular objects, the size can be the radius of the object.

Figure 2:
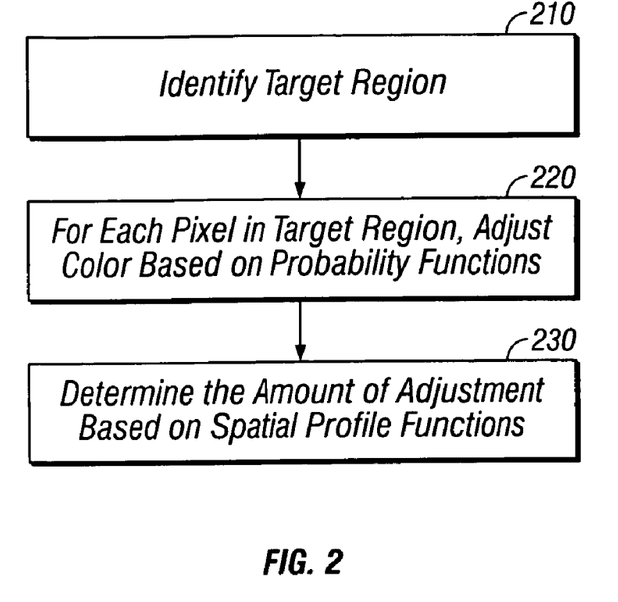
FIG. 2 is a flow diagram of a method of color adjustment in accordance with the invention.

The adjustment module 120 is operable to adjust the color of one or more pixels in the image. One method 200 for performing the adjustment is shown in FIG. 2. The method 200 begins with defining a target region of pixels in the image that represents the object of interest (step 210). The adjustment module 120 can use the output of the detection module 110 to define the target region of pixels. Alternatively, the adjustment module 120 can receive user input defining the target region of pixels.

The method 200 adjusts the color of one or more pixels in the target region based on one or more probability functions (step 220). Each probability function has a value at a given pixel that represents the probability that the pixel corresponds to a particular feature or set of features of the object. For each pixel in the target region or a portion thereof, the method 200 determines an amount by which the color of the pixel will be modified based at least in part on (e.g., as a function of) the probability value or values. In one implementation, the probability values range from 0 to 1, inclusive. The use of probability values enables the color adjustment to be performed on pixels that correspond to particular features while leaving pixels that correspond to other features (or to no particular feature) unadjusted or adjusted by a lesser amount.

In this specification, a probability value for a particular feature will be denoted as "pFeature". A probability value that is denoted as "pFeature1 or Feature2" represents fuzzyOr (pFeature1, pFeature2), where fuzzyOr (p1, p2)=p1+p2−p1*p2. Other definitions of the fuzzyOr function can also be used, for example, fuzzyOr (p1, p2)=maximum (p1, p2). The feature can be a feature of the image (e.g., foreground, background) and a corresponding feature probability value can represent the probability that a pixel is (or is not) part of the foreground (or background) of the image. It can also be a feature of an object in the image, for example, where the object is an eye, the feature can be the iris or sclera of the eye, and a corresponding feature probability value can represent the probability that a given pixel is part of the iris or sclera of an eye.

Different sets of probability values can be used in different portions of the target region. For example, for one portion of the target region, probability values that correspond to a first set of features can be used, while in another portion of the target region, probability values that correspond to a second set of features can be used.

The probability values can be calculated based on one or more probability functions. Alternatively, the probability values can be calculated based on a feed forward neural network. The calculation of probability values is discussed in more detail in co-pending U.S. application Ser. No. 10/639,238, filed on Aug. 11, 2003, entitled "Object Detection Using Dynamic Probability Scans", issued as U.S. Pat. No. 6,912,298 the disclosure of which is incorporated here by reference in its entirety.

In one implementation, the adjustment module 120 computes a new color value for a given pixel and then blends the new color value with the original color value for the pixel. The new color value can be determined based on a representative color for the region, for example, an average or median color for the region.

The adjustment module 120 uses the probability values to determine the relative contributions of the original and new color values to a resulting color value. For example, the probability values for a pixel can be used as weighting coefficients that determine the relative contribution of each color value (original and new) to the resulting color value for the pixel. The probability values can be used to bias more towards the original color or, alternatively, to bias more towards the new color. These two scenarios are illustrated by the following two functions respectively:

$$c''=\text{pFeature}*c+(1-\text{pFeature})*c'$$

$$c''=(1-\text{pFeature})*c+\text{pFeature}*c'$$

In both scenarios, the resulting color value (c") is the result of combining the original color value (c) with the new color value (c'). In the first scenario, if pFeature is 1, then the original color value is retained and the new color value has no effect on the resulting color value. By contrast, in the second scenario, if pFeature is 1, then the original color value has no effect on the resulting color value and the new color value dominates. If pFeature is less than 1 (but greater than zero), then both the original color value and the new color value have some effect on the resulting color value.

The adjustment amount can also be determined in part based on one or more spatial profile functions (step 230). The spatial profile is a function that has a value at a given pixel, the value being a function of the pixel's location relative to the spatial profile's area of influence. Pixels located beyond the area of influence have a spatial profile value that is zero or close to zero.

More than one spatial profile function can be used, each spatial profile function having a different area of influence. The area of influence for a given spatial profile can be defined based on one or more spatial properties of the object or of its features. The spatial properties include the size and the shape of the object or of its features.

A spatial profile can be implemented, for example, using a pixel mask that is populated with values calculated according to the following function:

Profile=1−sigmoid($S*(r/R−P)$), where sigmoid($x$) represents $1/[1+\exp(-x)]$.

As illustrated by the function, the spatial profile value for a given pixel is a function of the pixel's distance from the center (r), the radius of the target region (R), a steepness value (S) and a proportion value (P). The radial coordinate (r) can be computed as the square root of $[(x-x0)^2+(y-y0)^2]$, where x0 and y0 are the x and y coordinates of the center of the region of interest, and x and y are coordinates of a pixel in the image.

In the above-illustrated function, the values decrease exponentially as the radial coordinate becomes more distant from the center of the target region. The steepness value determines the steepness of the profile decay relative to the size of the target region. The proportion value determines where the spatial profile value decays to zero. For example, if P=1 then the decay occurs when the radial coordinate is equal to the radius of the target region. If P=2 then the decay occurs when the radial coordinate is twice the radius of the target region.

A spatial profile implementing the above-illustrated function can be used to modulate the adjustment amount such that pixels located farther away from the center of the target region are adjusted by a lesser amount than pixels located closer to the center of the target region. The area of influence can correspond to the target region (or portion thereof) or can extend beyond the target region to produce a smoother, more visually pleasing, effect across the boundaries of the target region.

Other functions can be used to define the spatial profile. Such functions include Gaussian functions, or any function of the pixel coordinates and target region coordinates. Example functions are exponentials, logarithms, sines, cosines, polynomials, and ratios of such functions. Thus, for example, a spatial profile can take the form of a function that decreases monotonically away from the target region center, such as Profile(r)=exp(−k0 r), or Profile(r)=1/(1+k1 r+k2 r*r). Similarly, a spatial profile that decreases away from the center, but not monotonically, can be implemented as Profile(r)=sin(k3 r) exp(−k0 r).

Redeye Correction

The above-described techniques can be applied to redeye correction. To compensate for the wide variation of eye colors and shapes, multiple different adjustment steps can be combined to increase the accuracy and completeness of redeye removal across a wide range of images. In one implementation, the redeye correction involves determining an iris color (e.g., blue, brown) and modifying pixel colors in a redeye region based on the iris color. For every pixel in the redeye region, the pixel color is blended with the iris color by an amount that is based on a redeye probability. The higher the probability that the pixel corresponds to redeye, the more influence the iris color has on the resulting color. The modification can be modulated to avoid adjusting (or minimize the adjustment that is applied to) pixels that do not correspond to the iris (e.g., pixels that correspond to the eyelid or to the sclera of the eye). The modulation involves using probability functions to determine the likelihood that the pixel being adjusted corresponds to skin or sclera. The modification can also provide extra correction to specific areas of the eye by using spatial profile functions that are calibrated according to the size and the shape of the specific area. Such areas include, for example, the center of the eye, or the ciliary margin of the eye, which tends to reflect a high concentration of red as a result of the high concentration of muscles in this region. The redeye correction can also use a variant of a median filter to eliminate any specks of red noise that still remain after the above-described modifications have been performed. In one implementation, the correction uses probability values such as those described in the above-referenced patent application filed on Aug. 11, 2003, entitled "Object Detection Using Dynamic Probability Scans".

Figure 3:
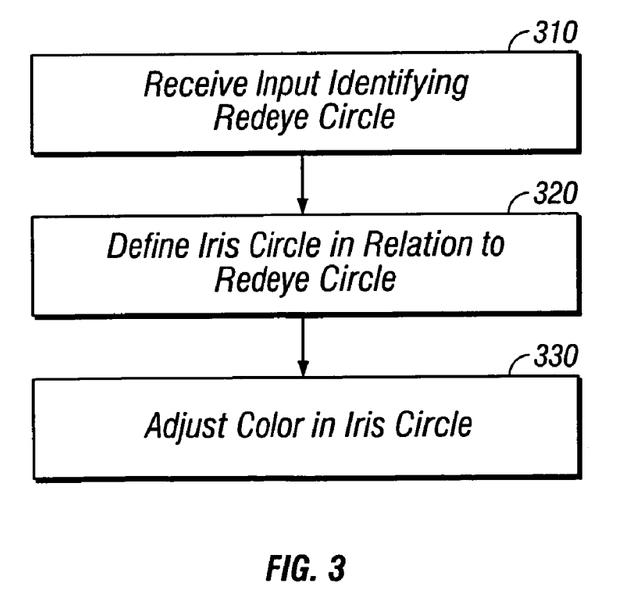
FIG. 3 is a flow diagram of a method of color adjustment in accordance with one implementation of the invention.

As shown in FIG. 3, a method 300 in accordance with this implementation of the invention begins when the adjustment module 120 receives input that identifies a region of redeye to be corrected (step 310). This region will be referred to as a redeye circle. In one implementation, this input is received from the detection module 110 and the input identifies the center pixel location and the radius, R, of the redeye circle.

The adjustment module 120 defines a circular region of pixels in the image that corresponds to the iris of the eye (step 320). This region will be referred to as an iris circle. The iris circle is centered on the redeye circle and extends beyond the redeye circle by a pre-determined amount. For example, the iris circle can be defined as 1.5 times the size of the redeye circle. Defining the iris circle to extend beyond the redeye circle improves the completeness of the correction and also improves the appearance of the correction by smoothing the effect of the correction across the edges of the redeye circle.

Figure 4:
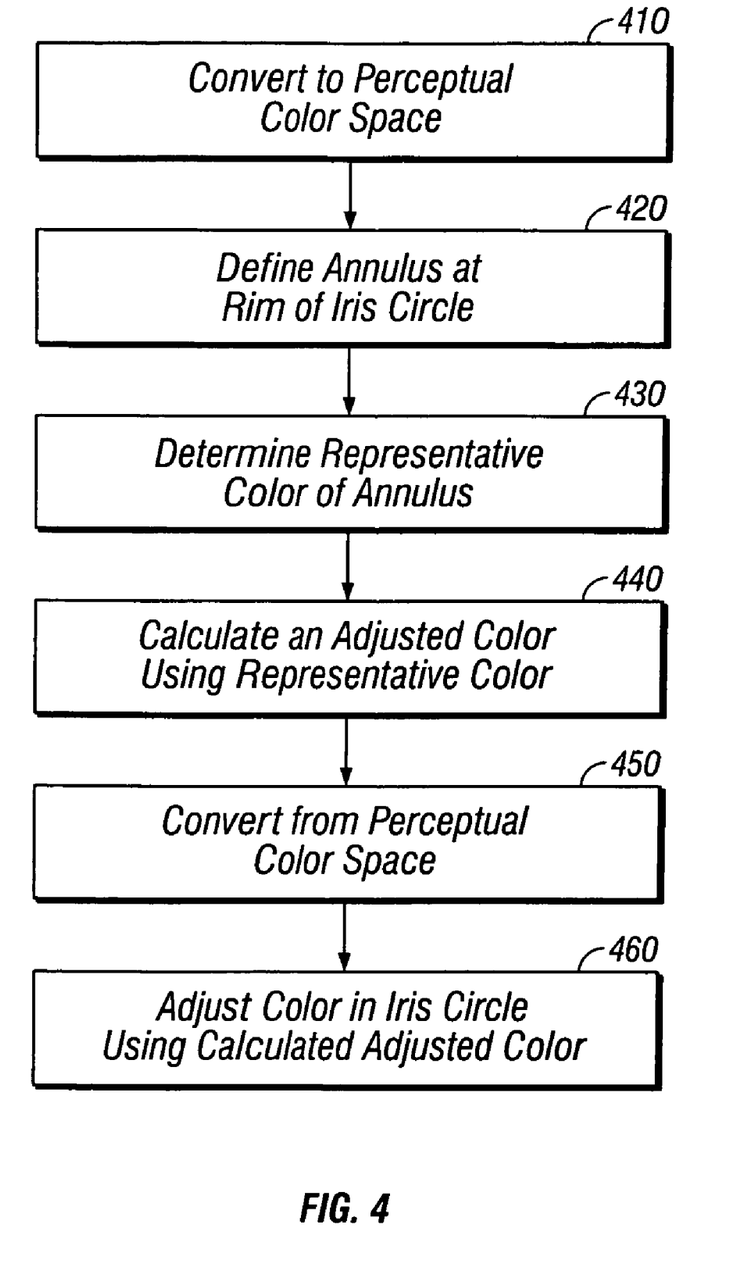
FIG. 4 is a flow diagram of a method of color adjustment in accordance with one implementation of the invention.

The adjustment module 120 iterates through the pixels within the iris circle and adjusts the colors for each pixel in the window (step 330). As shown in FIG. 4, the first step of the adjustment involves converting the color values for each pixel from RGB color space values of (red, green, blue) to perceptual lab color space values of (l, a, b) (step 410). The value "l" is a luminance value and "a" and "b" are chrominance values. The following conversion formulas can be used:

$$l=(1/sqrt(3))*\log [(L+1)(M+1)(S+1)];$$

$$a=(1/sqrt(6))*\log [(L+1)(M+1)/(S+1)^2]; \text{ and}$$

$$b=(1/sqrt(2))*\log [(L+1)/(M+1)].$$

L, M, and S represent retinal cone response values and serve as intermediate values in the conversion process. The values for L, M, and S can be determined as follows:

$$L=0.3811*\text{red}+0.5783*\text{green}+0.0402*\text{blue};$$

$$M=0.1967*\text{red}+0.7244*\text{green}+0.0782*\text{blue}; \text{ and}$$

$$S=0.0241*\text{red}+0.1288*\text{green}+0.8444*\text{blue}.$$

The conversion to a perceptual color space enables chrominance to be adjusted separately from luminance.

The adjustment module defines an annulus at the rim of the iris circle (step 420). In one implementation, the annulus is offset from the redeye circle by a distance of one pixel, so the inner radius of the annulus is equal to R+1. The outer radius of the annulus is set to maximum [minRimThickness, (rimExpansionFactor−1.0)*(R+1)], where the minRimThickness is equal to 2 and the rimExpansionFactor is equal to 1.1. This enables the outer radius to scale in proportion to the size of the redeye circle. Setting rimExpansionFactor equal to 1.1 causes the annulus to have a thickness of approximately 1/10 the radius of the redeye circle.

The adjustment module 120 determines representative chrominance values, <aRim>, <bRim>, within the annulus (step 430). The representative chrominance values represent the iris color of the eye. The representative chrominance values can be determined by calculating a weighted average <a> and <b> of each of the chrominance values:

$$<a>=\text{Sum}[a\text{ weight}]/\text{Sum}[\text{weight}];\text{ and}$$

$$<b>=\text{Sum}[b\text{ weight}]/\text{Sum}[\text{weight}].$$

The summation is performed over all pixels in the annulus. The weight equals 0 if pSkinOrRedeye>0.5 and the weight equals saturation*(1−pSkinOrRedeye) otherwise. Saturation can be set to abs(a)+abs(b), where abs(x) represents the absolute value of the variable x. The use of the probability values pRedeye and pSkin enables the adjustment module 120 to skip pixels that correspond to redeye or skin.

Alternatively, the representative chrominance values can be determined using other formulas for calculating means or median values (e.g., by taking the square root of the sum of the squares).

The adjustment module 120 uses the representative chrominance values to calculate an adjusted color for each pixel in the iris circle (step 440). The adjusted color is initialized to the chrominance values and then modulated according to one or more probability values and spatial profiles.

For example, as illustrated in the following function, the pRedeye probability value can be used to leave non-red pixels unadjusted:

$$a'=\text{pRedeye}*\text{aRim}+(1.0-\text{pRedeye})*a;\text{ and}$$

$$b'=\text{pRedeye}*\text{bRim}+(1.0-\text{pRedeye})*b.$$

In these functions, a' and b' are the adjusted color values whereas a, and b are the original color values.

One difficulty encountered in redeye correction is that portions of the eyelid or of the sclera (white of the eye) may overlap with the redeye circle. To avoid adjusting pixels that correspond to skin or sclera, the adjustment module 120 uses the probability values pSkin and pSclera to further modulate the adjustment as illustrated by the following functions:

$$a''=\text{pSkinOrSclera}*a+(1-\text{pSkinOrSclera})*a';\text{ and}$$

$$b''=\text{pSkinOrSclera}*b+(1-\text{pSkinOrSclera})*b'.$$

In these functions, a and b are the original chrominance values, a' and b' are the initial adjusted values (after the redeye adjustment) and a" and b" are the final adjusted values (after the skin and sclera adjustment).

An annular region of pixels at the perimeter of the redeye circle generally corresponds to the ciliary margin region of an eye. This region often contains redeye. To correct the redeye in this region, the adjustment module 120 desaturates the color of the pixels in this region.

In performing the desaturation, the adjustment module 120 uses a spatial profile, ciliaryProfile, which has a pre-determined area of influence that corresponds to the dimensions of the ciliary margin region. The dimensions can be defined empirically, for example, based on measuring the ciliary margin for one or more sample eyes. In one implementation, the ciliaryProfile is defined as $\exp(-\text{kCiliary}*(r/R-1.0)*(r/R-1.0))$. This produces a profile which takes on its maximum value of 1 when the radial coordinate, r, is equal to the iris radius, R. The profile takes on a value of less than 1 when r differs from R. The value of kCiliary determines the strength of the decay. Setting the value of kCiliary to $0.5/(0.2)^2$ causes the profile to have a specified thickness of roughly 20% of R.

In performing the desaturation, the adjustment module 120 also uses the probability values pSkin and pHighlight to avoid adjusting skin or highlight pixels, as illustrated below:

$$a'''=a''*[\text{pSkinOrHighlight}+(1-\text{pSkinOrHighlight})*(1-\text{ciliaryProfile})].$$

$$b'''=b''*[\text{pSkinOrHighlight}+(1-\text{pSkinOrHighlight})*(1-\text{ciliaryProfile})].$$

The center of the redeye circle often has the highest concentration of the red pixels. To correct the redeye in this region, the adjustment module 120 can use another spatial profile, centerDesaturationProfile, that has an area of influence corresponding to this region. The centerDesaturationProfile can be defined as $\text{sigmoid}(10.0*(r/R-0.3))$. These values provide significant desaturation to roughly 30% of the iris radius and produce fairly steep falloff which gives a visually pleasing result.

The redeye effect often causes the typically dark pupil to become overly bright. To correct the redeye in this region, the adjustment module 120 uses another spatial profile, pupilProfile, which is defined as $\text{sigmoid}(5.0*(r/R-0.5))$. The adjustment module 120 also uses the probability value of pHighlight to avoid darkening highlights, as illustrated below:

$$l=l*[\text{pHighlight}+(1.0-\text{pHighlight})*(\text{darkenFactor}+(1.0-\text{darkenFactor})*\text{pupilProfile})].$$ Setting the darkenFactor to 0.3 causes the adjusted luminance (l') to be 30% of the original luminance (l) in the middle of the pupil.

Once the adjusted color values for each pixel have been computed, the adjustment module 120 converts the adjusted color values from the perceptual color space back to the RGB color space (450). The following conversion formulas can be used:

$$\text{red}=4.46867*L-3.58868*M+0.119604*S;$$

$$\text{green}=-1.21972*L+2.383088*M-0.16263*S;\text{ and}$$

$$\text{blue}=0.058508*L-0.26108*M+1.205666*S.$$

L, M, S can be defined as follows:

$$L=\exp[(2l'\text{sqrt}(3)+a'\text{sqrt}(6)+3b'\text{sqrt}(2))/6.0]-1;$$

$$M=\exp[\log L-b'\text{sqrt}(2)]-1;\text{ and}$$

$$S=\exp[l'\log L-\log M]-1.$$

In these functions, l' is equal to l*sqrt3, a' is equal to a*sqrt6 and b' is equal to b*sqrt2.

The adjustment module 120 then adjusts the color values of each pixel in the iris circle to match the adjusted color values (step 460). In performing the adjustment, the adjustment module 120 applies a spatial profile, circleProfile, that has an area of influence corresponding to the entire iris circle:

$$\text{red}'=\text{circleProfile}*\text{red}+(1-\text{circleProfile}),$$

$$\text{green}'=\text{circleProfile}*\text{green}+(1-\text{circleProfile});\text{ and}$$

$$\text{blue}'=\text{circleProfile}*\text{blue}+(1-\text{circleProfile}).$$

CircleProfile can be defined as $1-\text{sigmoid}(5.0*(r/R-1.5))$. This profile function is an example of a more general profile function that has a value of 1 at the circle center, r=0, and decays towards 0 at a larger radius, here chosen to be 1.5*R. The steepness of the profile decay has been set to ⅕ of the circle radius, R. This profile function smoothes the transition between the region within the iris circle and the outer regions of the image which remain unadjusted.

To improve the completeness of the redeye correction, the adjustment module 120 can perform an additional adjustment step to remove more redeye. This additional adjustment is illustrated by the method 500 of FIG. 5.

Figure 5:
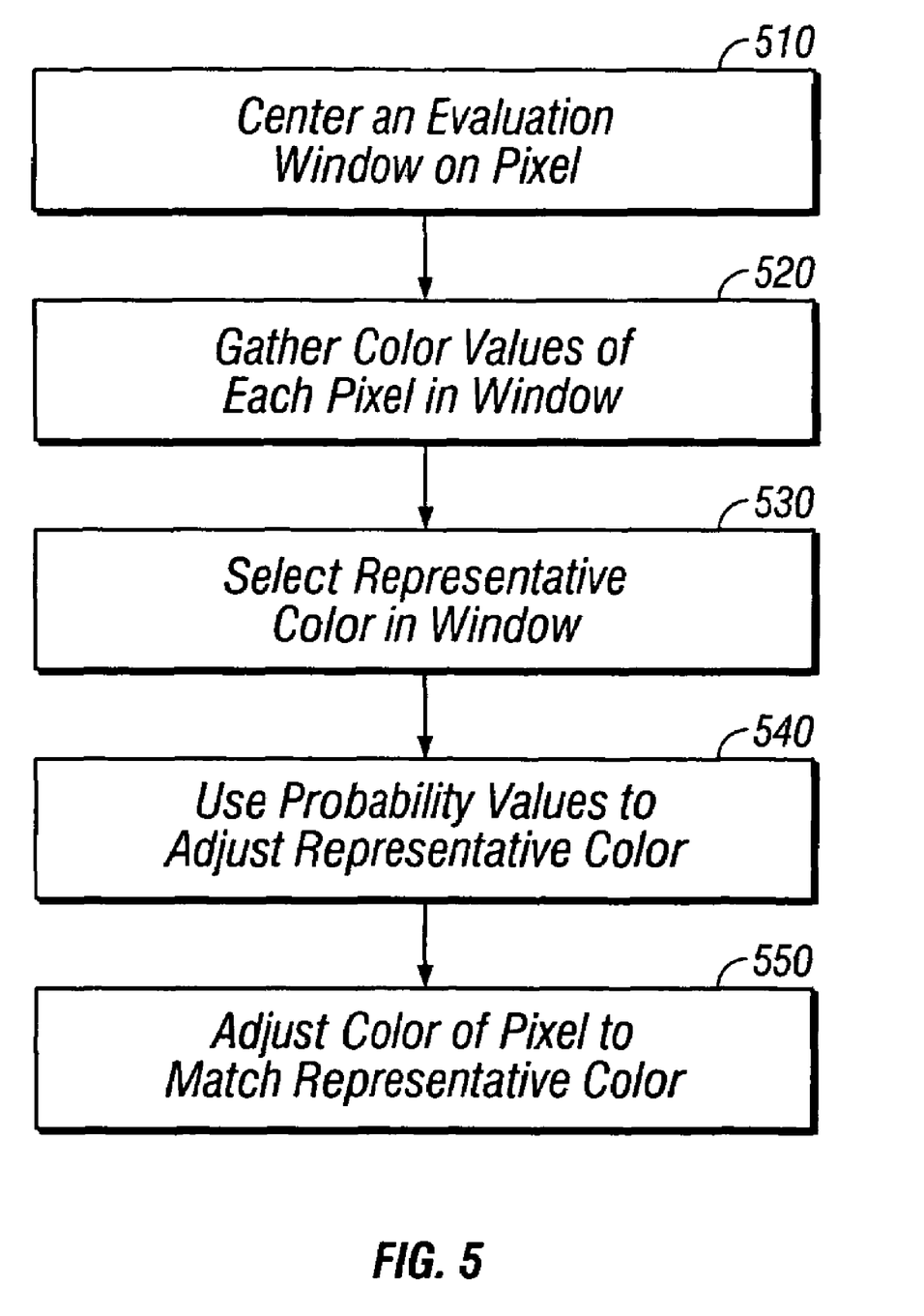
FIG. 5 is a flow diagram of a method of color adjustment in accordance with one implementation of the invention.

For each pixel that lies within the iris circle, the adjustment module 120 centers an evaluation window on the pixel (step 510). The size of the window can be scaled in proportion to the size of the iris circle. For example, the window dimensions can be defined as follows: The windowDiameter can be set to 2*windowRadius+1; and the windowRadius can be set to 1+int(irisCircleRadius)/10. This sets the window size to be ⅒ the size of the irisCircle and also constrains the window radius to be no smaller than 2 and no larger than 5. If the window size is too small, then accuracy is compromised, but if the window size is too large, then speed is compromised.

Within the window, the adjustment module 120 gathers a list of chrominance values for each chrominance value a and b (step 520). The list of values can be represented in the form of two arrays: aw[i] and bw[i]; where i represents the array element number, which can range from 0 to nWindowPoints−1, where nWindowPoints=windowDiameter².

The adjustment module 120 then selects a representative chrominance value from each list (step 530). The representative chrominance value can represent the median or mean color value for the pixels within the window. However, the presence of redeye within the window will cause the median or mean color to be more red than normal. Thus, to offset the redness from the redeye, a weighted median or mean value can be selected by first sorting each list and then choosing the list element at list position nWindowPoints/4. This biases more towards choosing less red colors.

To avoid adjusting highlights, the adjustment module can use the probability value pHighlight to adjust the color of the representative color values (step 540).

a'=pHighlight*a+(1−pHighlight)*awSorted[index];
and b'=pHighlight*b+(1−pHighlight)*bwSorted[index].

The adjustment module 120 then adjusts the color values of the pixel to match the representative color values (step 550). In performing the adjustment, the adjustment module 120 applies a spatial profile, circleProfile that has an area of influence corresponding to 1.33*R: circleProfile=1.0−sigmoid (5.0*(r/R−1.33)). This adjustment is illustrated below:

red"=red'*circleProfile+red*(1−circleProfile);

green"=green'*circleProfile+green*(1−circleProfile);
and blue"=blue'*circleProfile+blue*(1−circleProfile).

Brush Implementation

The above-described adjustment techniques can be implemented as a multi-profile brush tool that can apply multiple brush profiles during a single invocation of the brush tool. Each brush profile defines the shape of the brush's region of influence and the adjustments that are applied. The shapes and adjustments can differ from profile to profile.

Each of the above-described color adjustments can be implemented as a separate profile that is applied by the multi-profile brush. For example, the application of a spatial profile can be implemented as a Gaussian brush profile which produces a stronger effect at the center of the brush and reduced effect towards the edge of the brush. The location of the region of interest is determined by the brush center coordinate.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled, or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. The invention can also be used to change eye color, for example, to replace the iris color with a user-specified color. It can be used to modify lip color or lipstick color on lips. It can also be used to remove or reduce defects on skin given a suitable measure of skin defect probability. It can be used to modify (e.g., brighten, saturate, recolor) the color of flowers given a measure of probability which distinguishes flower petals from non-petals.

What is claimed is:

1. A computer-implemented method for adjusting the color of pixels in an image, each pixel having one or more color values, the method comprising:

identifying a target region of pixels in the image that represent an object, the object having a shape and a predefined set of features, the predefined set of features including at least a first feature, a second feature, and a third feature;

defining one or more spatial profile functions based at least in part on one or more spatial properties of one or more of the predefined set of features;

calculating a redeye probability that one or more pixels in the target region represent a portion of an eye exhibiting a redeye effect, based at least in part on a color of the one or more pixels;

calculating a first probability that the one or more pixels in the target region represent the first feature based at least in part on a color of the one or more pixels;

calculating a second probability that the one or more pixels in the target region represent the second feature based at least in part on a color of the one or more pixels;

combining the first probability and the second probability according to a probability function to calculate a third probability that the one or more pixels represent the first feature or the second feature; and computing a new color of the one or more pixels in the target region based at least in part on the redeye probability, the third probability that the one or more pixels represent the first feature or the second feature and the one or more spatial profile functions.

2. The method of claim 1, wherein the spatial properties include size.

3. The method of claim 1, wherein the spatial properties include shape.

4. The method of claim 1, wherein the spatial profile functions include a sigmoid function.

5. The method of claim 1, wherein the spatial profile functions include a Gaussian function.

6. The method of claim 1, wherein the spatial profile functions include a spatial profile function defined by a mask.

7. The method of claim 1, wherein identifying a target region of pixels includes:
receiving data that identifies the target region of pixels.

8. The method of claim 1, wherein the first feature comprises skin and the second feature comprises sclera.

9. The method of claim 1, wherein the first feature comprises skin and the second feature comprises highlight.

10. The method of claim 1, wherein the one or more spatial profile functions comprise a spatial profile function defined based at least in part on one or more spatial properties of a ciliary margin.

11. The method of claim 1, wherein:
the image is a photographic image including an eye exhibiting a redeye effect; and
the identified region of pixels includes a plurality of pixels that correspond to a portion of the eye that exhibits the redeye effect.

12. The method of claim 1, wherein:
the predefined set of features include at least one of skin, sclera, iris, highlight, an edge, or redeye.

13. The method of claim 1, wherein computing the new color includes:
computing the new color to match a representative color for the region; and
using the third probability that the one or more pixels represent the first feature or the second feature to change the computation.

14. The method of claim 13, wherein the representative color represents an iris color for the eye.

15. The method of claim 1, wherein computing the new color includes:
desaturating the color of pixels in a subregion of the region; and
using the third probability that the one or more pixels represent the first feature or the second feature to modulate the amount of desaturation.

16. The method of claim 15, wherein:
the subregion is the center of the region.

17. The method of claim 15, wherein:
the subregion is an outer rim of the region.

18. The method of claim 1, wherein computing the new color includes:
reducing a luminance value of one or more pixels that correspond to the pupil of an eye.

19. The method of claim 1, wherein computing the new color includes:
computing the color of a pixel based in part on color values of pixels surrounding the pixel.

20. The method of claim 19, wherein computing the new color of a pixel based in part on color values of pixels surrounding the pixel includes:
defining a window of pixels surrounding the pixel; and
determining a representative color for the window of pixels.

21. The method of claim 1 wherein computing the new color includes computing the color based in part on an original color of the one or more pixels.

22. A computer readable medium encoded with a computer program for adjusting the color of pixels in an image, the computer program comprising instructions operable to cause data processing equipment to perform operations comprising:

identifying a target region of pixels in the image that represent an object, the object having a shape and a predefined set of features, the predefined set of features including at least a first feature, a second feature, and a third feature;

defining one or more spatial profile functions based at least in part on one or more spatial properties of one or more the predefined set of features;

calculating a redeye probability that one or more pixels in the target region represent a portion of an eye exhibiting a redeye effect based at least in part on a color of the one or more pixels;

calculating a first probability that the one or more pixels in the target region represent the first feature based at least in part on a color of the one or more pixels;

calculating a second probability that the one or more pixels in the target region represent the second feature based at least in part on a color of the one or more pixels;

combining the first probability and the second probability according to a probability function to calculate a third probability that the one or more pixels represent the first feature or the second feature; and computing a new color of the one or more pixels in the target region based at least in part on the redeye probability, the third probability that the one or more pixels represent the first feature or the second feature and the one or more spatial profile functions.

23. The computer readable medium of claim 22, wherein the spatial properties include size.

24. The computer readable medium of claim 22, wherein the spatial properties include shape.

25. The computer readable medium of claim 22, wherein the spatial profile functions include a sigmoid function.

26. The computer readable medium of claim 22, wherein the spatial profile functions include a Gaussian function.

27. The computer readable medium of claim 22, wherein the spatial profile functions include a spatial profile function defined by a mask.

28. The computer readable medium of claim 22, wherein identifying a target region of pixels includes:
receiving data that identifies the target region of pixels.

29. The computer readable medium of claim 22, wherein the first feature comprises skin and the second feature comprises sclera.

30. The computer readable medium of claim 22, wherein the first feature comprises skin and the second feature comprises highlight.

31. The computer readable medium of claim 22, wherein the one or more spatial profile functions comprise a spatial profile function defined based at least in part on one or more spatial properties of a ciliary margin.

32. The computer readable medium of claim 22, wherein:
the image is a photographic image including an eye that exhibits a redeye effect; and
the identified region of pixels includes a plurality of pixels that correspond to a portion of the eye that exhibits the redeye effect.

33. The computer readable medium of claim 22, wherein:
the predefined set of features include at least one of skin, sclera, iris, highlight, an edge, or redeye.

34. The computer readable medium of claim 22, wherein computing the new color includes:
computing the new color to match a representative color for the region; and
using the third probability that the one or more pixels represent the first feature or the second feature to change the computation.

35. The computer readable medium of claim 34, wherein the representative color represents an iris color for the eye.

36. The computer readable medium of claim 22, wherein computing the new color includes:
desaturating the color of pixels in a subregion of the region; and
using the third probability that the one or more pixels represent the first feature or the second feature to modulate the amount of desaturation.

37. The computer readable medium of claim 36, wherein: the subregion is the center of the region.

38. The computer readable medium of claim 36, wherein: the subregion is an outer rim of the region.

39. The computer readable medium of claim 22, wherein computing the new color includes:
reducing a luminance value of one or more of the pixels that corresponds to the pupil of the eye.

40. The computer readable medium of claim 22, wherein computing the new color includes:
computing the color of a pixel based in part on the color values of pixels surrounding the pixel.

41. The computer readable medium of claim 40, wherein computing the new color of a pixel based in part on the color values of pixels to surround the pixels includes:
defining a window of pixels to surround the pixel; and
determining a representative color for the window of pixels.

42. The computer readable medium of claim 22, wherein computing the new color includes computing the color based in part on an original color of the one or more pixels.

* * * * *

UNITED STATES PATENT AND TRADEMARK OFFICE
CERTIFICATE OF CORRECTION

PATENT NO. : 7,664,322 B1  Page 1 of 1
APPLICATION NO. : 10/639612
DATED : February 16, 2010
INVENTOR(S) : Gregg D. Wilensky It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1605 days.

Signed and Sealed this

Thirtieth Day of November, 2010

David J. Kappos
*Director of the United States Patent and Trademark Office*